United States Patent

[11] 3,613,919

| [72] | Inventors | Arvo H. Ceepo<br>7485 S.W. 128th St., Miami, Fla. 33156;<br>John Paul Jones, 121 N. E. 209th Terrace,<br>Miami, Fla. 33165 |
|---|---|---|
| [21] | Appl. No. | 27,627 |
| [22] | Filed | Apr. 13, 1970 |
| [45] | Patented | Oct. 19, 1971 |

[54] RAMP-TYPE WRECKER SERVICE VEHICLE
8 Claims, 4 Drawing Figs.

[52] U.S. Cl. .................................................. 214/85.1,
214/86 A, 296/1 A
[51] Int. Cl. .................................................. B60p 3/12
[50] Field of Search ............................................ 214/85.1,
505, 86 A, 450; 296/1 A

[56] References Cited
UNITED STATES PATENTS
2,486,189  10/1949  McCormick ................. 214/85.1
3,411,644  11/1968  Cook ............................ 214/85.1 X

*Primary Examiner*—Albert J. Makey
*Attorney*—John Cyril Malloy

ABSTRACT: Load handling apparatus adapted to be mounted on an automotive service tow truck or wrecker truck configuration. The load-handling apparatus includes a primary ramp section extending upwardly and forwardly over the truck chassis unit and a secondary rampway section hingedly supported adjacent the lower end portion of the primary rampway section. The secondary rampway section may be moved to a lowered inclined disposition defining substantially a continuation of the primary rampway section and providing bridgelike ramp means for permitting a disabled automobile load mass or the like to be drawn across the secondary rampway section and to a disposition bodily supported on the primary rampway section; the secondary rampway section may be moved to a raised disposition thereby permitting a disabled vehicle or the like to be trailingly drawn in a semisupported disposition behind the automotive truck chassis unit. The secondary rampway section also supports a pulley over which a winch cable is reeved when the secondary rampway section is in a raised disposition and affords lifting and support pulley means for lifting and trailingly conveying a damaged or disabled automobile or the like.

INVENTOR.
ARVO H. CEEPO
JOHN PAUL JONES
BY John Cyril Malloy
ATTORNEY.

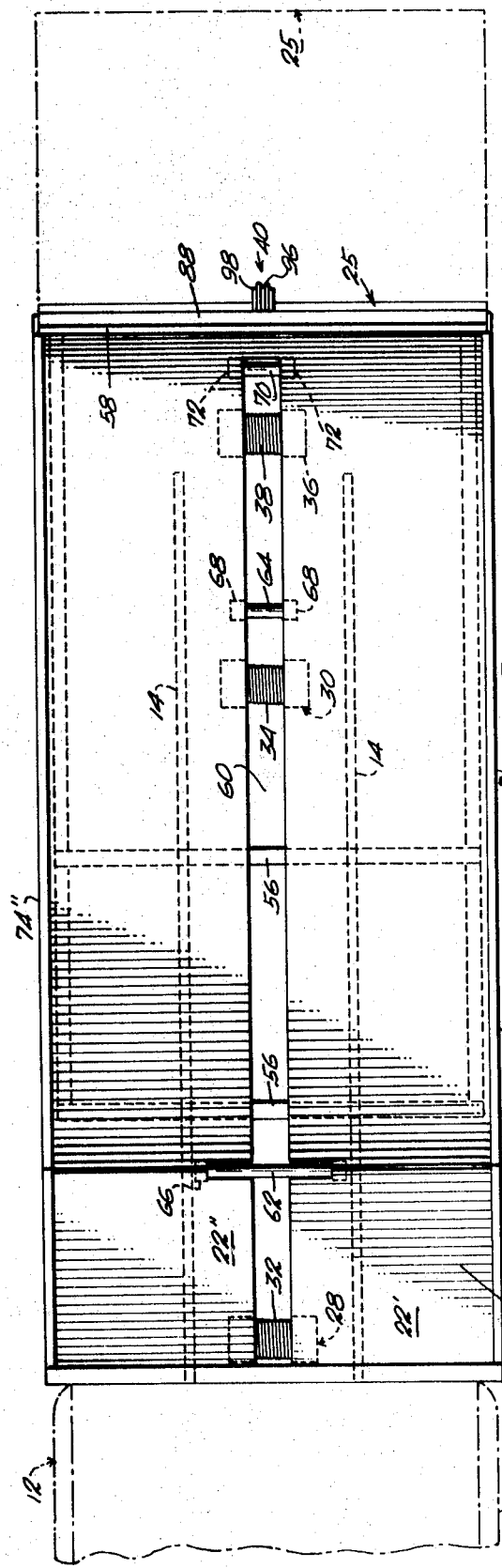
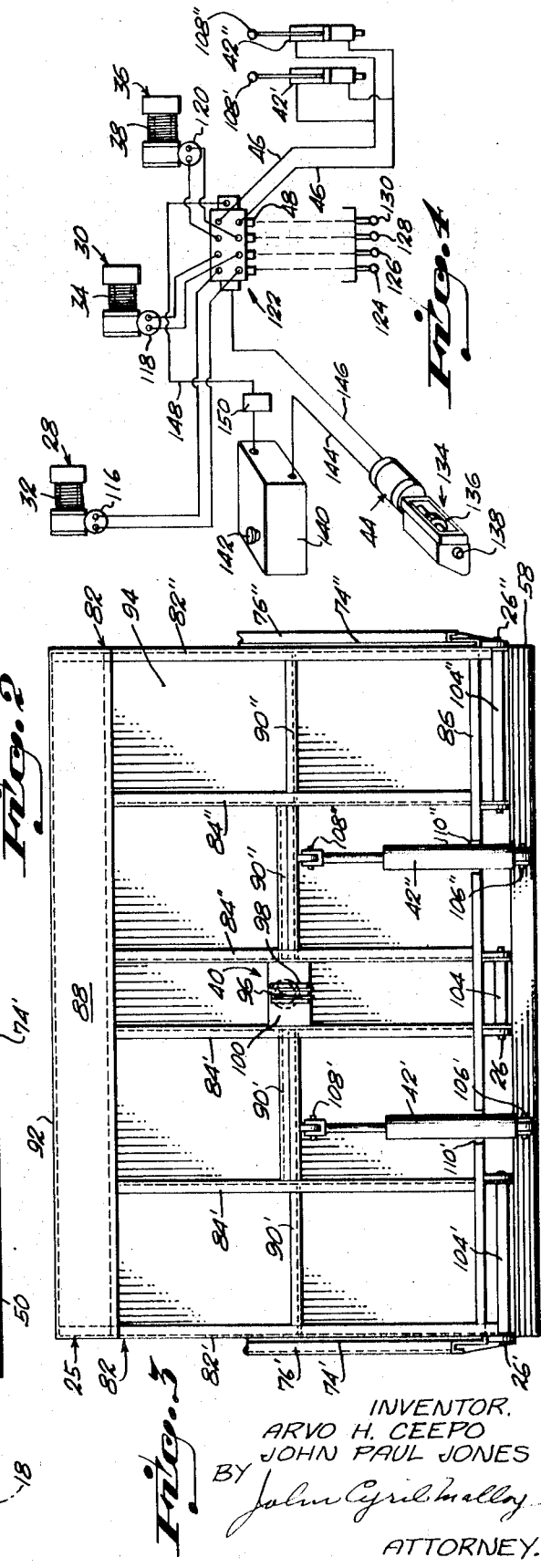

RAMP-TYPE WRECKER SERVICE VEHICLE

BACKGROUND OF THE INVENTION

1. Field of the Invention

Relates to mobile or vehicular load-handling apparatus generally and particularly to such apparatus adapted for handling or transporting new, used or disabled automobile load structure.

2. Description of the Prior Art

Heretofore, a typical practice in automobile pickup and delivery service and in the transporting of new or used automobiles, a conventional road service-type automobile wrecker or tow-service vehicle was utilized and the automobile load structure typically was trailingly conveyed in a semisupported disposition with the front steering wheels of the automobile load being elevated from the roadway. In the transporting of a new, used or disabled automobile in a trailingly drawn semisupported disposition, certain undesirable features are noted: (a) As the vehicle is lifted and trailingly transported, there is considerable likelihood of damage to the front bumper or grill section of the automobile and such as may necessitate considerable expense and inconvenience in the repair of such damage; (b) also, as an automotive vehicle is drawn behind a typical automobile wrecker unit, the fluid drive or automatic transmission parts of the towed vehicle may be damaged; (c) moreover, as an automobile is trailingly conveyed by a wrecker unit or the like, road scum or dirt may soil or damage the paint finish and the forward interior engine section of the automobile, thereby requiring considerable labor and expense in cleaning and repair procedure.

A typical automobile wrecker unit is provided with winch line and towing means for handling only one wrecked or disabled automobile. Often, at the scene of an automobile accident, two or more disabled vehicles may be involved and there may be only one tow-service wrecker vehicle available or at the scene of the accident. The typical practice may be for the tow wrecker operator to first remove one of the damaged vehicles from the roadway and then make a return trip for the other disabled vehicle. As may well be appreciated, this is rather an inefficient manner of removing wrecked or damaged vehicles, particularly from heavy traffic and on a busy highway or roadway intersection.

Automobile wrecker units or other such vehicular winch units are also utilized for bodily lifting and transporting automobile component parts or other wheelless heavy objects such as trees, stumps, junk automobile bodies or the like from public and private property. Certain load objects handled thusly may be of bulky incongruent configuration rendering such load-handling awkward and difficult as the load is bodily lifted and secured to the rear of the wrecker vehicle to prevent swinging of the load during transit.

SUMMARY OF THE INVENTION

The load-handling apparatus of the instant invention provides ramp means for lifting and bodily conveying a new or used automobile vehicle and in such a manner as to substantially obviate damage to the paint finish of the vehicle from road scum, gravel, or the like, and prevents damage to the grill and front part of a new, used or disabled vehicle as it is lifted and transported. Also, in bodily lifting and conveying an operative or inoperative automobile, the fluid drive or transmission parts of the vehicle are not subject to wear or damage as is often caused in trailingly conveying a vehicle. The load-handling apparatus of the invention is particularly useful in highway wrecker service when two or more automobiles are wrecked or disabled at the scene of an accident. The load-handling structure of the instant invention is operative for handling and simultaneously conveying two disabled vehicles by bodily transporting one vehicle and trailingly conveying the other vehicle. Such procedure permits a busy highway or intersection to be expeditiously cleared of the damaged vehicles for permitting the traffic to flow in a normal manner. The vehicular load-handling structure of the instant invention is highly maneuverable and rapidly operative, permitting it to be used in quickly and effectively loading and unloading an automotive load mass or other load object. The load-handling structure is particularly useful for handling wheelless load objects such as abandoned or junk automobile body parts or the like from public or private property. A bulky or awkward load object may be drawn upwardly along the inclined rampway structure in a scooplike manner and transported in a disposition firmly resting on the rampway structure.

BRIEF DESCRIPTION OF THE DRAWING

FIG. 2 is a top view of the loadhandling apparatus taken as from FIG. 1;

FIG. 3 is a rearward end view of the apparatus as viewed from the right of FIG. 1; and FIG. 4 is a schematic view illustrating the hydraulic power means of the invention.

DESCRIPTION OF THE PREFERRED EMBODIMENT

Figure 1:
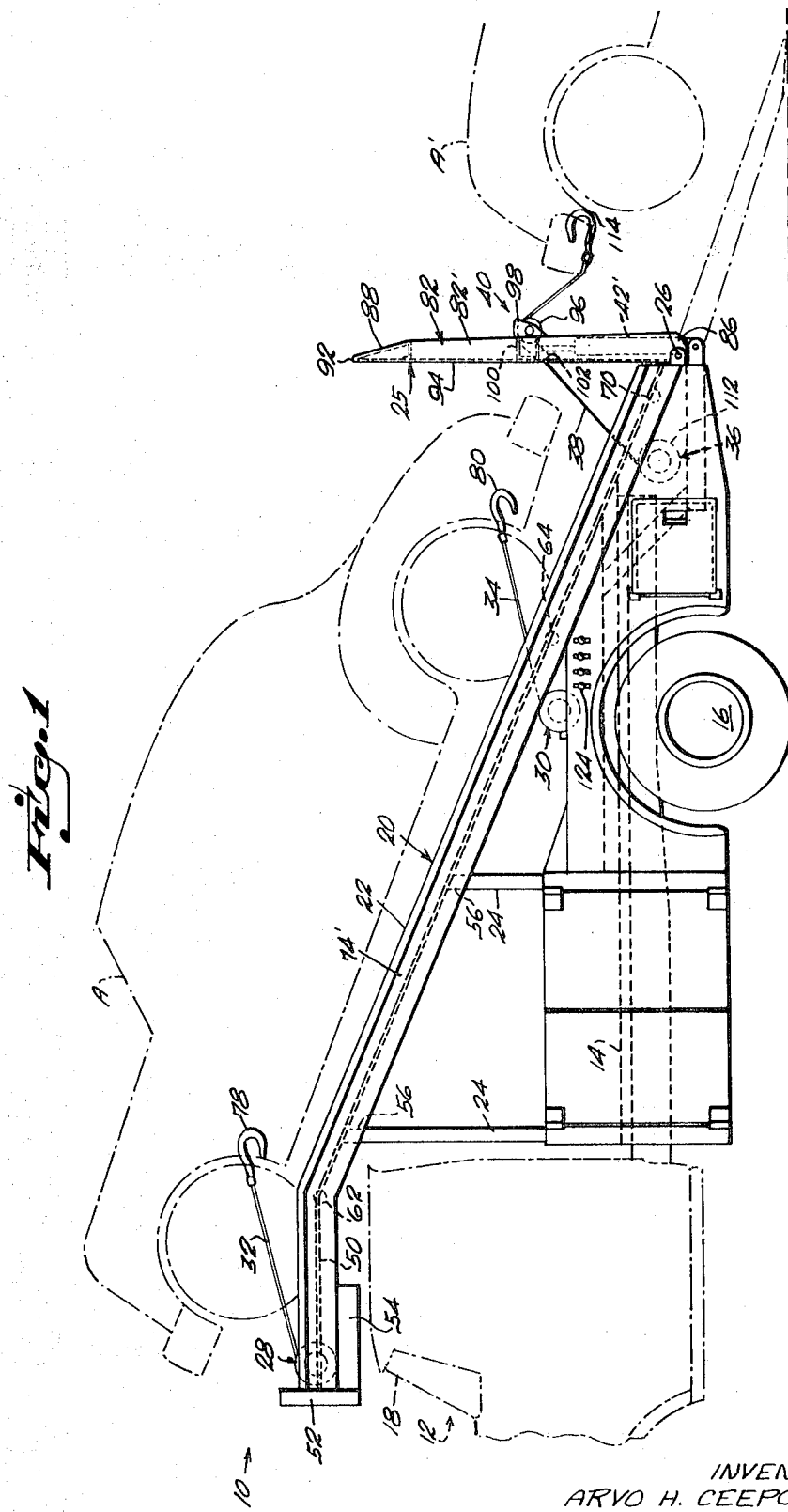
FIG. 1 is a side elevational view of the load handling apparatus of the instant invention illustrated as being mounted on an automotive truck chassis unit (shown partially in broken lines)

The load-handling structure of the instant invention is generally indicated by numeral 10 and is shown and described as being mounted on a typical heavy duty automotive truck chassis unit 12 including frame structure 14, rearward wheel and axle means 16 and having a vehicle operator and control zone truck cab enclosure 18. The load-handling apparatus will further be described in conjunction with automobile load structure (shown in broken lines) including a first automobile load unit A and a second automobile load unit indicated A'.

The load handling apparatus indicated 10 basically includes ramp means indicated 20 including a primary rampway section 22 superjacently supported by leg means 24 over the rearward portion of truck chassis frame structure 14; a secondary rampway section 25 pivotally supported on a horizontal axis by pin means 26 adjacent the lower extremity of primary rampway section 22; primary purchase means for elevatingly loading an automobile unit A on primary rampway section 22 including an upper and lower primary winch assembly 28 and 30 including respectively winch line or cable means 32, 34; secondary purchase means for lifting and elevatingly supporting the front wheels of an automobile load from the ground surface including a secondary winch assembly 36 including a winch line 38, and including pulley means 40 supported centrally on secondary rampway section 25 operatively runningly supporting the winch line 38; and includes selectively operative hydraulic power means for pivotally raising or lowering secondary rampway section 25 including a pair of double acting hydraulic ram assemblies 42', 42" hydraulically energized through pump means 44 and conduit means 46, 46 and selectively operative through hand control valve means 48. Selective manipulation of the control valve 48 is operative for arranging the secondary rampway section 25 in a downwardly inclined lowered disposition (shown in broken lines in FIG. 1) and an upright raised disposition (the full line showing in FIG. 1).

The primary rampway section 22 preferably includes a horizontal table portion 50 elevatingly arranged at the upper extension of the rampway section and adapted to supportingly engage the front or rear wheels of an automobile load mass A supported on the primary rampway. The horizontal table portion 50 preferably includes a front cross member 52 bridging the forward upper end portions of the left- and right-rampway parts 22', 22" of the primary rampway section 22. The table portion 50 of rampway section 22 also preferably is provided with pan structure 54 subjacently spanning the rampway sections 22', 22" and functioning for catching oil drippings from winch assembly 28 and for holding the free end portion of the winch line 32 when it is in a retracted disposition. The pan structure 54 prevents damage to the windshield and upper structure of the automotive truck cab enclosure 18.

The primary rampway section is fixedly supported by upright leg structures 24, 24 from the truck chassis frame 14 and support the primary rampway in a forwardly and upwardly extending disposition symmetrically over the longitudinal axis of the truck chassis unit 12. Intermediate cross members 56, 56 and a lower rearward cross member 58 rigidly interconnect in parallel coplanar arrangement the left and right primary rampway parts 22', 22" and define a longitudinally extending opening 60 defining passageway means for the winch lines 32, 34 respectively of the upper and lower winch assemblies 28, 30. Idler rollers 62, 64 freely journaled respectively in bearings 66, 68 transversely span opening 60 and provide cable deflector means respectively for winch line means 32, 34 respectively of upper and lower winch assemblies 28, 30. In like manner, a roller 70, idly journaled in bearings 72, 72 provides cable deflector means for winch line or cable 38 of the secondary winch assembly 36.

The rampway parts 22', 22" of rampway section 22 each preferably includes an outer upturned flange respectively 74', 74" defining parallel extending flange structure particularly functioning as rub rail guide means for guiding an automobile load structure A as it is elevatingly runningly loaded on or unloaded from the primary rampway section. The parallel longitudinally extending rampway flange portions 74', 74" each is provided with an outwardly and downwardly rolled upper edge portion respectively 76', 76" functioning for providing a smooth upper edge of the respective rampway flanges and for reinforcing the flanges against lateral deflection.

Hook elements 78, 80 preferably are fitted on the outward free end of the respective winch lines 32, 34 and are operative for detachable securement in typical fashion to the frame or other support structure of the automobile load mass A. As is illustrated in FIG. 1, the upper and lower winch assemblies 28, 30 may be simultaneously operative with the hook elements 78, 80 simultaneously binding the front and rear portions of the automobile load as it is being transported by the load-handling apparatus.

The pivotally supported secondary rampway section 25 of ramp means 20 includes openwork frame structure 82 defined substantially by longitudinal side members 82', 82" and leftward and rightward arranged longitudinal intermediate members 84', 84'; 84", 84'". The frame structure 82 additionally includes transversely extending frame members 86, 88 disposed respectively on the proximal and distal edge portions of rampway section 25, and includes intermittently arranged transversely extending frame members 90', 90'; 90", 90" arranged respectively leftward and rightward of the secondary rampway structure. The longitudinally extending frame members 82', 82", 84', 84" preferably are slightly tapered from the proximal end of each toward the distal end thereof and the transversely extending distal edge member 88 preferably is of V section and includes upper and lower plates intersecting in a transversely extending distal corner edge 92. Platelike decking 94, of rectangular configuration, is fixedly secured on the upper side of frame 82 and fully covers the enclosed area of the secondary rampway frame structure.

The pulley means 40 stationarily located on rampway section 25 preferably includes a pulley member 96 idly journaled in pulley housing structure 98 which in turn is supported on transversely extending bracket structure 100 fixedly secured between longitudinal frame members 84', 84". An aperture 102 formed in the central portion of deck plate structure 94 provides passageway means for winch line 38 of the secondary winch assembly 36. Bearing tubes 104, 104', 104" fixedly secured respectively between longitudinal frame members 84', 84"; 82', 84'; 84", 82" define coaxial bearing structure for receiving respectively pivot pin members 26, 26', 26" in pivotally supporting the secondary rampway section on the lower terminus of the primary rampway.

The hydraulic ram assemblies 42', 42" are simultaneously coactingly operative and are articulatingly secured respectively at the base and rod end portions 106', 106"; 108', 108" respectively to the rear cross member 58 of the primary rampway section 22 and the intermediate cross members 90', 90" of the frame structure 82 of the secondary rampway section (see FIG. 3). The transversely extending cross member 86 of the secondary rampway section 25 is provided with U-shaped clearance recesses 110', 110" for freely receiving respectively the ram assemblies 42', 42" as the secondary rampway 25 is pivotally raised and lowered.

The winch drum section 112 of winch assembly 36 preferably is stationarily located subjacently of the rearward end portion of rampway 22 and is adapted for operation mainly when the secondary rampway 25 is in an upright disposition (see the full line showing in FIG. 1). A hook element 114 attached to the free end of winch line 38 is adapted for securement to the front frame structure of an automobile A' in lifting and trailingly conveying the automobile load. As may well be appreciated, the secondary rampway section 25 provides dual functioning means respectively for: (a) providing rampway structure bridgingly extending between the ground surface and the lower rearward end of rampway 22 when the secondary rampway 25 is in a lowered rearwardly extending disposition; (b) provides movable mast structure selectively operative for stationarily supporting the pulley means 40 in an elevated operative disposition or in a lowered inoperative disposition. The mast structure for supporting the pulley means 40 preferably is integrally embodied in the structure of the secondary rampway section 25 and is simultaneously movable therewith between a raised operative and a lowered inoperative disposition respectively with the raising and lowering of the secondary rampway.

Each of the winch assemblies 28, 30, 36 preferably is hydraulically powered and includes respectively hydraulic drive motors 116, 118, 120 individually selectively energized from hydraulic pump 44 and through multivalve means 122. The control valve of each winch assembly motor 116, 118, 120 corresponds with the control valve 48 of the simultaneously operative ram assemblies 42', 42"; each valve preferably is a five-port bidirectional flow valve for hydraulically energizing each motor 116, 118, 120 selectively clockwise or counterclockwise respectively for paying out or reeling in a respective winch line 32, 34, 38. Hand lever means 124, 126, 128, 130 individually connected respectively to each valve of multivalve means 122 through mechanical linkage means 132 provides means for individual selective manipulation of the respective control valves and individual actuation respectively of the primary and secondary winch assemblies 28, 30; 36 and the ram means 42', 42" of the secondary rampway section 25 of the load handling apparatus.

The hydraulic pump 44 preferably is driven through a power takeoff assembly 134 fixedly secured in typical fashion to the automotive transmission section of the truck chassis unit 12. A driven gear 136 of the power takeoff assembly 134 is adapted to runningly engage a drive gear (not shown) of the automotive truck transmission for driving the hydraulic pump 44 through shaft means 138. The power takeoff assembly 134 may typically include lever operative dog clutch means (not shown) operative respectively for engaging or disengaging drive gear 136 with the drive gear of the truck transmission and respectively for energizing or deenergizing the hydraulic pump. A hydraulic oil reservoir 140 having a filler cap 142 supplies oil to pump 44 through intake conduit 144. A supply conduit 146 conducts pressurized hydraulic oil to the multivalve means 122 and a return conduit 148 passing through filter means 150 returns the oil from the multivalve means 122 to the oil reservoir.

In using the load handling apparatus 10 of the invention, and in loading a disabled vehicle A onto the primary rampway 22, the following procedure may be carried out: The truck unit 12 is positioned in alignment with the front or rear of the disabled automobile A and by manipulation of hand lever 130 the secondary rampway 25 is pivotally arranged in a lowered rearwardly extending disposition with the distal end portion engaging the ground surface (see broken line showing in FIG. 1). The hydraulic motor 116 of the upper primary winch assembly 28 may then be actuated through manipulation of hand lever 124 to play out winch line 32 and to engage hook 78 with the forward or rearward portion of the vehicle A. The motor 116 may then be energized in the opposite direction by manipulation of the hand lever 124 to cause the winch line 32 to be reeled in thereby drawing the disabled vehicle across rampway 25 and up the inclined rampway 22 to a disposition whereat the vehicle is fully supported on the rampway 25 with the front or rear wheels thereof resting on the rampway table portion 50 (see FIG. 1). The lower primary winch assembly 30 may then be energized by manipulation of hand lever 126; the hook element 80 of winch line 34 may be engaged with the lower end frame portion of the vehicle A and the winch line 34 taughtly drawn to bind the vehicle to the primary rampway during transit.

A second disabled vehicle A' may then be lifted and trailingly connected with the automotive truck unit 12 by carrying out the following procedure: By manipulation of hand lever 130, the ram assemblies 42', 42'' are simultaneously energized for causing the rampway 25 to be pivotally actuated to an upright disposition. The hand lever 128 controlling winch assembly 36 may then be manipulated to energize motor 120 in a direction for playing out line 38 and for engaging hook element 114 with the front or rear part of the wrecked or disabled vehicle. The hand lever 128 may then be again manipulated to reel in the winch line thereby lifting and supporting the front or rear of the vehicle and arranging the vehicle in a disposition to be trailingly conveyed by the automotive truck unit.

The automobiles A and A' may be removed from or unloaded off the load handling apparatus 10 and truck chassis unit 12 by substantially carrying out the above-described procedure in a converse manner.

While the instant invention has been shown and described herein in what is conceived to be the most practical and preferred embodiment, it is recognized that departures may be made therefrom within the scope of the invention.

What is claimed is:
1. The combination with an automotive motor truck unit including frame structure, rearward wheel and axle means and having a vehicle operator and control zone arranged forwardly on the motor truck unit; load handling apparatus adapted for lifting and conveying a load object or vehicular automobile load mass comprising ramp means supported on said motor truck unit frame structure including a primary rampway section of a size adapted to underlie and simultaneously supportingly engage the left, right, front and rear wheels of the automobile load mass and including a secondary rampway section of a size adapted to underlie and simultaneously supportingly engage the left and right wheels of at least the forward or rearward wheel and axle means of the automobile load mass, said primary rampway section having a lower end terminating at a disposition rearwardly of the rearward wheel and axle means of the motor truck unit and having an elevated upper end protruding forwardly over the motor truck unit, said secondary rampway section being pivotally supported at its forward terminus on a horizontal pivot axis stationarily arranged adjacent the lower rearward end of said primary rampway section and with said secondary rampway section being swingable between a lowered reclining disposition with the proximal edge portion thereof resting on the ground or roadway surface and a raised upright disposition, primary purchase means for loading a load object or automobile load mass onto said primary rampway section when said secondary rampway section is in a lowered disposition including primary winch means including a winch line having a free end adapted for detachable attachment to a load object or automobile load mass and oriented for drawing the load mass elevatingly along the ramp means, and secondary purchase means for lifting the front wheels of the automobile load mass from the roadway surface and for trailingly conveying the load mass behind the motor truck unit when the secondary rampway section is in a raised upright disposition, said secondary purchase means including pulley means operative on an axis lying generally transversely of the motor truck unit, movable mast means selectively operative for stationarily supporting said pulley means in a raised operative disposition or in a lowered inoperative disposition, said secondary purchase means including secondary winch means including a winch line reeved over said pulley means and having a free end adapted for detachable attachment to the load object or an end of an automobile load mass when said mast means is disposed in raised operative disposition.

2. Load-handling apparatus as set forth in claim 1 wherein said secondary rampway section and mast means includes common structure and with said pulley means being substantially stationarily located on said secondary rampway section and simultaneously movable with said rampway section between a raised operative and lowered inoperative disposition respectively with the raising and lowering of said secondary rampway section.

3. Load-handling apparatus as set forth in claim 1 which additionally includes selectively operative power means for pivotally raising and lowering said secondary rampway section.

4. Load-handling apparatus as set forth in claim 3 wherein said power means includes fluid operative ram means connected through leverage means to said secondary rampway section and including pressurized fluid means communicating through conduit means with the ram means and including selectively operative control valve means for energizing said ram means in raising and lowering said secondary rampway section.

5. Load-handling apparatus as set forth in claim 1 wherein said primary winch means and secondary winch means each includes selectively operative hydraulic power means individually operative for elevatingly drawing a load mass along the ramp means and for lifting and trailingly conveying a load mass along a road surface.

6. Load-handling apparatus as set forth in claim 5 wherein said primary winch means includes two individually operative primary winch assemblies each including a winch line having a free end adapted for detachable attachment to an automobile load mass.

7. Load-handling apparatus as set forth in claim 1 wherein said primary rampway section includes a horizontal table portion elevatingly arranged at the upper extension of said rampway section and adapted to supportingly engage the front or rear wheels of an automobile load mass supported on said primary rampway section.

8. Load-handling apparatus as set forth in claim 7 wherein said table portion of said primary rampway section is arranged substantially directly over the vehicle operator and control zone of the motor truck unit.